United States Patent [19]

Shikano et al.

[11] Patent Number: 4,775,504
[45] Date of Patent: Oct. 4, 1988

[54] PROCESS FOR PRODUCING REFRACTORY PLATE FOR SLIDING NOZZLE

[75] Inventors: Hiroshi Shikano; Toshihiro Suruga, both of Kitakyushu, Japan

[73] Assignee: Kurosaki Refractories Co., Ltd., Kitakyushu, Japan

[21] Appl. No.: 896,166

[22] Filed: Aug. 13, 1986

[30] Foreign Application Priority Data

Aug. 22, 1985 [JP] Japan ................. 60-185567

[51] Int. Cl.$^4$ .............................. C04B 35/64
[52] U.S. Cl. ....................... 264/63; 264/65; 501/100
[58] Field of Search ............ 264/63, 65; 501/100

[56] References Cited

U.S. PATENT DOCUMENTS 4,506,022  3/1985  Whittemore ............... 501/100
4,627,945  12/1986  Winkelbauer ............... 264/63

FOREIGN PATENT DOCUMENTS 58125660  10/1981  Japan .
58-020901  4/1983  Japan .
603027  1/1985  Japan .
60-609973  4/1985  Japan .
56096775  8/1985  Japan .

OTHER PUBLICATIONS

Ryshkewitch, Eugene, Oxide Ceramics Physical Chemistry and Technology, 1960, Academic Press, New York, p. 58.
Derwent Abstract of Japanese Pat. Pub. 56-016112.

Primary Examiner—James Derrington
Attorney, Agent, or Firm—Jordan and Hamburg

[57] ABSTRACT

Alumina-carbon-based refractory plates for the sliding nozzle are produced from alumina powder and carbon powder of specific particle diameter, in addition to the conventional refractory materials. The plates are durable and have good resistance to molten steel because of a compact structure which prevents the sticking of molten steel.

2 Claims, No Drawings

PROCESS FOR PRODUCING REFRACTORY PLATE FOR SLIDING NOZZLE

BACKGROUND OF THE INVENTION

The present invention relates to a process for producing a refractory plate for a sliding nozzle apparatus used to control the flow of molten iron and molten steel in a steel making plant.

Refractory plates for a sliding nozzle apparatus to control the flow of molten metal have been indispensable refractory parts in steel making plants where a refining treatment in a ladle and continuous casting are now in general use. Such refractory plates for the sliding nozzle apparatus are required to have very high performance and to function to control the flow rate of the casting and withstand severe use conditions.

Refractory plates in the sliding nozzle apparatus experience strong thermal shock and wearing when coming into contact with high temperature molten steel. In addition to these physical actions, they are subject to mechanical erosion and chemical corrosion by the molten steel and slag. Therefore, refractory plates for the sliding nozzle are required to have high spalling resistance and high strength, as well as high corrosion resistance.

In order to fulfil such requirements with materials of the sliding plate having balanced properties, many efforts have been made. Recently, as a result of such efforts, alumina-carbon has come into use in the steel industry because of its stable durability.

Alumina-carbon-based refractory material for the sliding nozzle plates does not need to use pitch and tar which causes fumes harmful to health in use, and makes possible the production of a plate superior in durability compared with conventional pitch-impregnated ceramic bond plates. Generally, the refractory plates for the sliding nozzle are used without preheating, and rapidly heated from room temperature to 1500° C. or more of the molten steel. This rapid heating subjects the refractory material to an extremely great thermal shock, and, simultaneously, to physical and chemical wearing when it is practically used for controlling the flow of molten steel. In the case of alumina-carbon-based refractory material, specified problems such as absorbing carbon into the molten steel therefrom and oxidizing of carbon in the refractory by the atmosphere are recognized, which makes it very important to select a proper carbon source for the refractory. For this reason, investigations are now being made to improve the materials constituting the alumina-carbon-based refractory plates for the sliding nozzle with the aforementioned problems in mind. For example, Japanese Patent Publication No. 58-020901 discloses the effect of fine carbon powder having a specific surface area greater than 50 m²/g; Japanese Patent Publication No. 56-016112 discloses the effect of using a carbonaceous material in combination with sillimanite mineral material; Japanese Patent Application laid-open No. 56-096775 discloses the effect of adding $ZrO_2$-$Al_2O_3$-$SiO_2$-based raw material; Japanese Patent Application Laid-open No. 58-125660 describes the effect of $Al_2O_3$-$ZrO_2$-based material; Japanese Patent Application Laid-open No. 60-060973 describes the combined use of pitch and phenolic resin; and Japanese Patent Application Laid-open No. 60-003027 describes the combined use of novolak-type phenolic resin and resol-type phenolic resin.

Properties of the carbon to be incorporated into alumina-carbon-based plates are important. For example, according to Japanese Patent Publication No. 58-020901, carbon black is used as the major carbon source because it is insoluble in molten steel and highly resistant to oxidation by molten steel, which contribute to improve the durability of refractory plates. However, the amount of carbon black to be added should be limited to in the range of from 3 to 7 wt. % because an amount less than 3 wt. % leads to deficiency in corrosion resistance and an amount in excess of 7 wt. % causes a lack of spalling resistance. In order to overcome such disadvantage, improvements were proposed in Japanese Patent Application Laid-open Nos. 58-125660, 60-060973, and 60-003027. Although these proposed inventions are effective to a certain extent, they are not effective enough to eliminate damages caused by molten metal sticking on the sliding surface. A means to reduce such damage is to increase the amount of carbon in the composition. However, merely increasing the amount of graphite or amorphous carbon causes promoted dissolution of carbon in the molten metal, which in turn leads to damage to the edge of the nozzle hole and incomplete stopping of molten steel flowing. As a result, increasing carbon content does not contribute to lengthening the life of the plates. Further, improvements in thermal properties by changing the features of coke derived from a binder is also proposed in Japanese Patent Application Laid-open Nos. 60-060973 and 60-003027. However, these proposed methods are not very effective preventing the sticking of the molten steel.

The conventional alumina-carbon-based refractory have good resistance has chemical corrosion by molten slag, but has a disadvantage in that it is difficult to obtain a high compact and a high strength structure because of a lack of uniform dispersion and sintering ability of fine powder constituents due to no-sintering properties of carbon powder in the manufacturing process. Particularly, it is recognized that the matrix structure is easy to peel-off when removing the steel sticking in practice.

SUMMARY OF THE INVENTION

An object of the present invention is to improve the durability of the conventional alumina-carbon-based refractory plates for the sliding nozzle apparatus.

This object is accomplished by adjusting the particle size of components to be added to the refractory plates, so that the structure is made uniform and the sinterability is improved.

The present invention comprises the steps of preparing a composition mixture consisting of.

(a) 50 to 90 wt. % of material containing more than 90 wt. % of alumina, (b) 0 to 30 wt. % of one or more selected from the group consisting of $Al_2O_3$-$SiO_2$-based, $Al_2O_3$-$ZrO_2$-based, and $Al_2O_3$-$SiO_2$-$ZrO_2$-based raw materials having a coefficient of thermal expansion lower than $8 \times 10^{-6}$ at 1000° C., (c) 3 to 8 wt. % of carbon powder having a BET surface area greater than 50 m²/g, (d) 4 to 10 wt. % in total of Si fine powder and carbon fine powder other than the carbon powder defined above in (c), and (e) a remainder composed of other refractory materials, mixing and molding the composition mixture with a binder, and firing the molded composition mixture and binder in a reducing atmosphere.

DETAILED DESCRIPTION OF THE PREFERRED EMBODIMENTS

All the components of the above-mentioned composition are indispensable, to make the resulting refractory plate for the sliding nozzle from the sticking of molten steel limiting the life of the plate. The present invention completely dissolves disadvantages involved in the conventional manner. According to this invention, easy-to-sinter finely divided alumina powder having an average particle diameter smaller than 1 μm is dispersed in the matrix so that the distance between each alumina particle can be reduced, which makes it possible to incorporate more carbon without any problem. The easy-to-sinter fine alumina powder, together with the fine carbon powder and carbon resulting from the binder, fill the space between each single microns order alumina particle. This affords the compact structure superior in resistance a corrosion and dissolution by molten steel.

According to microscopic survey of the surface in contact with molten steel, sintering of the easy-to-sinter fine powdered alumina and forming of the protecting layer were recognized. This protecting layer prevents molten steel from impregnation into the structure of the plate bricks and hence reduces the sticking of molten steel. This effect will be clear in the example described below.

The meaning of defining the range of each component in the composition mixture will now be described. An amount less than 5 wt. % of the easy-to-sinter fine alumina powder does not form the fine matrix structure, and with an amount in excess of 20%, excessive sintering takes place, resulting in decreased spalling resistance and poor durability. The amount of the Si powder is generally in the range or 2% to 7%, depending on the amount of residual carbon in the refractory composition in the plate bricks. With an amount less than 2 wt. %, satisfactory strength is not achieved, and with an amount in excess of 7 wt. % of Si, strength is undesirably high. The fine carbon powder other than defined by (c) should be in the range of 2% to 5%. With an amount less than 2 wt. %, the improvement in spalling is not satisfactory; and with an amount in excess of 5 wt. %, the dissolution by molten steel is high.

The component (a) is the main material constituting the alumina-carbon-based plate for the sliding nozzle. It may be sintered alumina or electromelted alumina or both. The component (b) may be omitted where high corrosion resistance is required. With an amount in excess of 30 wt. %, the resulting plate will be severely damaged by dissolution even in the casting of aluminum killed steel.

The easy-to-sinter fine alumina powder should have an average particle diameter smaller than 1 μm and a BET specific surface area greater than 3.0 m$^2$/g, and the carbon powder has a BET specific surface area greater than 50 m$^2$/g. When they are used together, the resulting plate has a more compact structure than a conventional alumina-carbon-based refractory plate for the sliding nozzle. The refractory plate obtained according to this invention prevents the sticking of molten steel to a great extent.

EXAMPLES

The invention is now illustrated by the following examples and comparative examples.

Molding compounds were prepared according to the composition of refractory powders and phenolic resin as a binder as shown in Table 1. Each molding composition powder mixture was made into a plate for the sliding nozzle through the steps of molding, sintering, pitch impregnation, and firing. The characteristic properties of the resulting plates are also shown in Table 1, with comparison.

The plates obtained as mentioned above were used in actual operation to evaluate their life. The results are also shown in Table 1. In each test run twenty sets of plates were used and the number of charging times was counted until the standard limit was reached. The life is expressed by this number. This actual test demonstrates that the plate of the invention has a greatly lengthened life.

TABLE 1

| | | Comparative Example 1 | Comparative Example 2 | Example 1 | Example 2 |
|---|---|---|---|---|---|
| Composition of refractory powders (wt. %) | Zilconia mullite | 20 | 20 | 20 | 20 |
| | Al$_2$O$_3$ | 72 | 60 | 67 | 62 |
| | Finely divided alumina powder | — | 10 | 5 | 10 |
| | Silicon (fine powder) | 3 | 3 | 3 | 3 |
| | Carbon (ultrafine powder) | 5 | 3 | 5 | 5 |
| | Carbon (artificial graphite) | | | | |
| | Phenolic resin | +4 | +5 | +4.5 | +5.0 |
| Characteristics | Bulk density | 3.05 | 3.03 | 3.03 | 3.01 |
| | Apparent porosity (%) | 7.0 | 6.8 | 7.0 | 7.1 |
| | Breathability (cm$^3$/cm · H$_2$O · sec) | 5.5 × 10$^{-6}$ | 5.0 × 10$^{-6}$ | 5.5 × 10$^{-6}$ | 5.1 × 10$^{-6}$ |
| | Spalling test *1 | Large cracking and falling | Medium cracking | Small cracking | No cracking |
| | Index of damage by dissolution *2 | 100 | 98 | 100 | 85 |
| Experiments with actual ladles | 250 t ladle (CC) | 4.3 | 4.1 | 4.5 | 5.1 |
| | 300 t ladle (IC) | 2.4 | 2.6 | 2.4 | 3.0 |
| | 350 t ladle (CC) | 3.1 | 3.3 | 4.0 | 5.6 |
| | Sticking of steel after use | Large | Large | Medium | Small |

| | | Example 3 | Comparative Example 3 | Example 4 | Example 5 |
|---|---|---|---|---|---|
| Composition of refractory powders (wt. %) | Zilconia mullite | 20 | 20 | 15 | 15 |
| | Al$_2$O$_3$ | 52 | 47 | 64 | 59 |
| | Finely divided alumina powder | 20 | 25 | 10 | 15 |
| | Silicon (fine powder) | 3 | 3 | 3 | 3 |
| | Carbon (ultrafine powder) | 5 | 5 | 5 | 5 |

TABLE 1-continued

|  |  |  |  |  |  |
|---|---|---|---|---|---|
|  | Carbon (artificial graphite) |  |  | 3 | 3 |
|  | Phenolic resin | +5.0 | +5.5 | +5.0 | +5.5 |
| Characteristics | Bulk density | 2.98 | 3.00 | 3.01 | 3.00 |
|  | Apparent porosity (%) | 6.7 | 6.3 | 6.9 | 6.9 |
|  | Breathability (cm$^3$/cm · H$_2$O · sec) | $4.7 \times 10^{-6}$ | $3.2 \times 10^{-6}$ | $4.9 \times 10^{-6}$ | $4.6 \times 10^{-6}$ |
|  | Spalling test *1 | No cracking | Large cracking | No cracking | No cracking |
|  | Index of damage by dissolution *2 | 90 | 90 | 85 | 85 |
| Experiments with actual ladles | 250 t ladle (CC) | 6.8 | 6.0 | 7.3 | 7.0 |
|  | 300 t ladle (IC) | 3.0 | 2.8 | 3.5 | 4.2 |
|  | 350 t ladle (CC) | 5.7 | 3.5 | 5.7 | 5.1 |
|  | Sticking of steel after use | Small | Medium | Almost none | Almost none |

*1 The cycle of rapid heating at 1600° C. for 5 minutes followed by air cooling was repeated three times.
*2 The sample was immersed in molten steel (composed of 2.5 kg of electrolytic iron and 62.5 g of slag) at 1600° C. for 1 hour. Wastage of the surface is indicated in terms of index, with that in Comparative Example being 100.

What is claimed is:

1. A process for producing alumina-carbon-based refractory plates for a sliding nozzle, comprising preparing a composition mixture consisting of:
   (a) 50 to 90 wt. % of material containing more than 90 wt. % of alumina,
   (b) 0 to 30 wt. % of one or more materials selected from the group consisting of Al$_2$O$_3$-SiO$_2$-based, Al$_2$O$_3$-ZrO$_2$-based, and Al$_2$O$_3$-SiO$_2$-ZrO$_2$- based raw materials having a coefficient of thermal expansion lower than $8 \times 10^{-6}$ at 1000° C.,
   (c) 3 to 8 wt. % of carbon powder having a BET specific surface area greater than 50 m$^2$/g,
   (d) 4 to 10 wt. % in total of Si fine powder and carbon fine powder other than the carbon powder defined in (c),
   (e) 5 to 20 wt. % alumina fine powder having an average particle diameter of less than 1 μm and a BET specific surface area greater than 3.0 m$^2$/g, and
   (f) a remainder of other refractory materials, mixing and molding said composition mixture with a binder, and firing the molded composition mixture and binder in a reduction atmosphere.

2. A process as in claim 1, wherein the 4 to 10 wt. % total in (d) is 2 to 7 wt. % Si fine powder and 2 to 5 wt. % carbon find powder.

* * * * *